United States Patent
Kostin et al.

[15] 3,648,091
[45] Mar. 7, 1972

[54] STATOR BAR WINDING OF ELECTRIC MACHINE

[72] Inventors: Konstantin Fedorovich Kostin, prospekt Lenina 48, kv. 101; Georgy Konstantinovich Sapunov, ulitsa Stachek 25, kv. 95; Alvian Afanasievich Svirin, ulitsa Pervomaiskaya 44, kv. 5; Valery Ivanovich Strakhov, prospekt Lenina 48, kv. 40; Grigory Iosifovich Shur, ulitsa Krosnoflottser 7, kv. II, all of Sverdlovsk, U.S.S.R.

[22] Filed: June 11, 1970
[21] Appl. No.: 45,351

[52] U.S. Cl. .................................................310/260
[51] Int. Cl. .......................................................H02k 3/46
[58] Field of Search..................310/260, 270, 271, 272, 258

[56] References Cited

UNITED STATES PATENTS

| | | |
|---|---|---|
| 3,151,260 | 9/1964 | MacCracken .........................310/270 |
| 3,365,600 | 1/1968 | Penn.....................................310/260 |
| 3,435,517 | 4/1969 | Fortenbach............................310/260 |

FOREIGN PATENTS OR APPLICATIONS

| | | |
|---|---|---|
| 331,894 | 1/1921 | Germany...............................310/260 |
| 1,190,555 | 4/1965 | Germany...............................310/270 |
| 1,021,407 | 3/1966 | Great Britain.........................310/270 |

*Primary Examiner*—J. D. Miller
*Assistant Examiner*—R. Skudy
*Attorney*—Waters, Roditi, Schwartz & Nissen

[57] ABSTRACT

A stator bar winding for an electric machine in which the heads of end connections of the winding are insulated by means of cups and cavities between the heads and the cups are filled with an insulating compound. Between adjacent cups, there are provided spacers secured against displacements at least on one side, by supports on the lateral surface of said cups. The spacers may be made in the form of wedges and inserts.

8 Claims, 7 Drawing Figures

Patented March 7, 1972 3,648,091

STATOR BAR WINDING OF ELECTRIC MACHINE

The present invention relates to high-power electric machines and, more particularly, to stator bar windings for electric machines.

Known in art and widely used are the stator bar windings for electric machines, in which the end connections of the bars, at the connection places thereof form heads insulated by cups of a solid insulating material, while the spaces between the heads and the cups are filled with a self-solidifying insulating mass or compound.

One disadvantage of the known construction is the poor spatial fixing of the heads of the end connections against the action of electrodynamic forces resulting from sudden short circuits or due to incorrect synchronization of the associated electric machine.

These forces result in displacement of the winding bars and wearing of the insulation, while in windings with direct cooling they break the tightness of the hydraulic cooling system, which fact reduces the operational reliability of the electric machine involved.

An object of the present invention is to eliminate the above-mentioned disadvantages.

A main object of the invention is to provide a stator bar winding for an electric machine having a higher operational reliability due to an improved fixing of the end connections of the winding within the zone of the heads.

This object is attained, in accordance with the invention, due to the fact that in the stator bar winding of an electric machine, in which the heads of the end connections are insulated with cups while the cavities between the heads and the cups are filled with an insulating mass or compound, spacers are provided between the adjacent cups which are secured against displacements at least on one side by means of supports arranged on the lateral surface of the above-said cups.

The above spacers are preferably made in the form of wedges or inserts, the latter being coupled together by means of a threaded joint.

The coupled inserts are preferably provided with intercommunicating chambers filled with an insulating compound.

In addition, the cavities between the heads and the cups and the insert chambers intercommunicate and are filled with a self-solidifying insulating compound.

In some cases it is advantageous to connect the spacers to the supports of the cups along spherical surfaces. The spacers can be connected to the supports of the cups by means of pivot joints, the gaps in the joints being filled with a solidified compound that fixes the joints in position.

The proposed winding features a higher reliability due to an improved mounting of the front portions within the zone of the heads.

Such rigid mounting of the end connections protects the winding against damage under the action of the electrodynamic forces so that the life of the insulation is increased, thus insuring a high service life of the machine as a whole.

The proposed winding is most suitable for high-power electric machines featured by high values of electric and electromagnetic loads, particularly for machines with liquid cooling of the stator winding which are characterized by very high electrodynamic forces and a low inherent rigidity of the bars, in which the heads with the adjacent portions represent rather a large part of the end connection of the winding.

In the liquid-cooled machines, the invention reduces vibrations and, therefore, makes it possible to eliminate possible damage to the hollow conductors and hydraulic joints.

The present invention can find particular utility when used in high-power turbogenerators, vertical hydraulic turbogenerators and synchronous compensators.

An economical effect from the use of the proposed invention is obtained due to high operational reliability of the electric machine as a whole and considerable reduction of the cost of repairs and due to an increased amount of electric power transmitted to consumers.

The present invention was used in a 250-Mw. hydrogenerator for the Chirkeysk Power Station and for a 300-Mw. hydrogenerator with interconductor cooling of the stator winding for the Nurek Power Station.

Other more specific objects and advantages of the invention will be apparent from the following description with reference to the accompanying drawings, in which.

Figure 1:
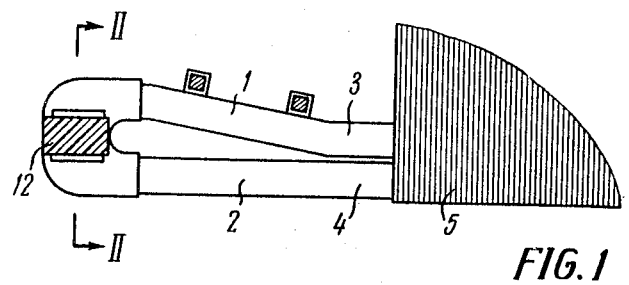
FIG. 1 is a partial sectional view of a stator with windings in accordance with the invention.
Figure 2:
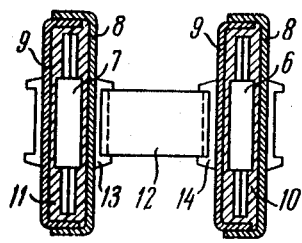
FIG. 2 is a sectional view taken through line II—II in FIG. 1 with wedge-shaped spacers.

As shown in FIG. 1, the end connections 1, 2 of the bars 3, 4 of the winding of the stator 5 at the place of their connection form heads 6, 7 (FIG. 2) on which are put cups 8, 9 made of a solid insulating material. The spaces 10, 11 between the heads 6, 7 and the cups 8, 9 are filled with a self-solidifying insulating compound.

Provided between the cups 8, 9 of the adjacent heads 6, 7 is a wedge 12 which is secured by supports 13, 14 made on the lateral surface of the cups 8, 9.

Electrodynamic forces, for example appearing during a short circuit, tend to displace the adjacent heads 6, 7 relative to each other.

The forces directed tangentially for mutual approach of the heads 6, 7 are taken by the wedge 12 which is a compression member.

The wedge 12 through the supports 13, 14 takes the forces acting upon the heads 6, 7 in a radial direction.

If the radial forces are not very large or if they are taken up by other supporting elements of the winding, it is sufficient to provide supports or supports on only one side of the wedge for its fixing.

In this case the cups on the other side of the wedge are made supportless.

Such a design is somewhat simpler and does not require high accuracy in placing the heads in space.

Figure 3:
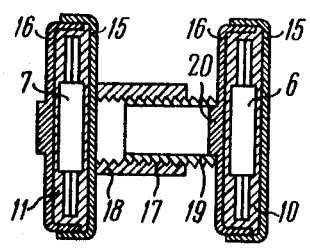
FIG. 3 is a view similar to that of FIG. 2 with spacers made in the form of threaded-joint inserts.

In the bar winding shown in FIG. 3, the spacer installed between the cups 15, 16 of the adjacent heads 6, 7 is made in the form of inserts 18, 19 coupled through a thread 17, which are fixed at least on one side by the support 20 on the lateral surface of the cup 16, whereas on the other side of the spacer a similar support need not be provided on the lateral side of the cup 15.

In this construction of the winding, the spacers of the inserts 18, 19 coupled through the thread 17 prevent the heads 6, 7 from approaching each other under the action of electrodynamic forces. Such a construction is especially suitable at considerable deviations in the distance between the heads 6, 7 and, if necessary, allows one to tighten the spacers during the operation of the machine.

Figure 4:
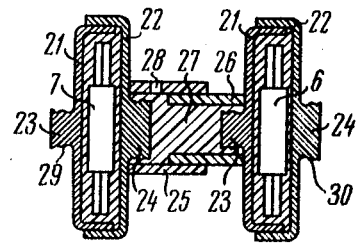
FIG. 4 is a view similar to that of FIG. 2 with spacers made in the form of hollow inserts filled with an insulating compound.

In the bar winding shown in FIG. 4, the spacer mounted between the cups 21, 22 and fixed with the aid of the supports 23, 24 on the lateral surfaces of these cups is made as hollow inserts 25, 26 forming a chamber 27 which through a hole 28 is filled with a self-solidifying insulating compound providing for connection of the cups 21, 22 of the adjacent heads 6, 7.

For a better connection, the supports 23, 24 may be provided with developed surfaces 29, 30.

In this construction of the winding, the filling of the chambers 27 with a self-hardening compound provides for a rigid interconnection of all the heads 6, 7. In contrast to the preceding examples, the spacers work both as compression and tension members. Such a connection of all the heads of the winding provides for a rigid ring of mutually coupled heads formed about the machine axis.

This construction of the winding is recommended for electric machines operating under the heaviest conditions.

Figure 5:
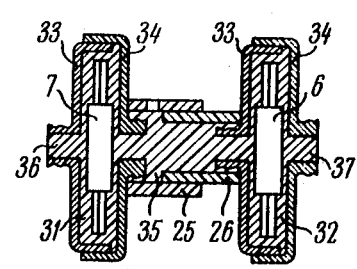
FIG. 5 is the device shown in FIG. 4 with intercommunicating chambers filled with an insulating compound.

The bar winding shown in FIG. 5 differs from the previously described winding in that the spaces 31, 32 between the heads 6, 7 and the cups 33, 34 and the chambers 35 of the hollow inserts 25, 26 intercommunicate through the holes 36, 37 in the cups 33, 34 and are filled with a self-solidifying insulating compound.

In this construction of the winding there are realized all the qualities of the winding, shown in FIG. 4 and the possibility is provided for simultaneously filling with a self-solidifying insulating compound the spaces 31, 32, 35 of several adjacent heads and spacers or of all heads and spacers of the winding located on one side of the stator.

Such a solution of the problem in some cases is more advantageous.

Figure 6:
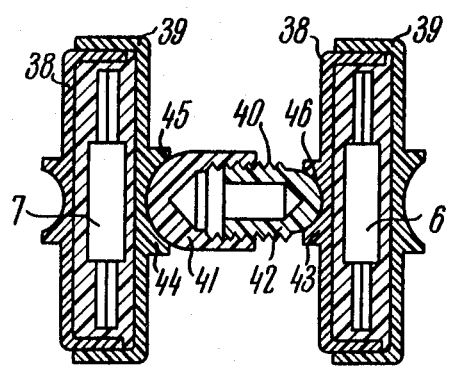
FIG. 6 is the device shown in FIG. 3 with inserts and supports with mated spherical surfaces.

In the bar winding shown in FIG. 6, like in that shown in FIG. 3, the spacer arranged between the cups 38, 39 of the adjacent heads 6, 7 is made in the form of inserts 41, 42 joined through a thread 40, which are mated with the supports 43, 44 on the lateral surfaces of the cups 38, 39 along the spherical surfaces 45, 46.

The inserts 41, 42 adjustably connected through the thread 40 prevent the heads 6, 7 from approaching each other under the action of electrodynamic forces.

Such a construction can be successively used not only at high deviations in the distance between the heads 6, 7 but also at considerable warpings of the cups 38, 39.

Figure 7:
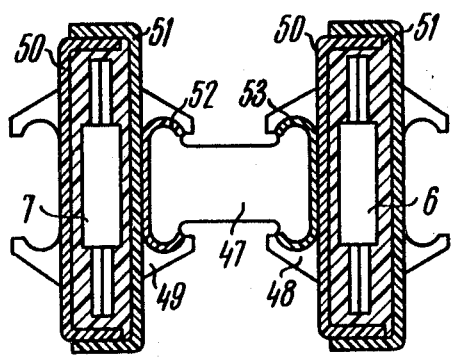
FIG. 7 is a sectional view taken through line II—II in FIG. 1, the spacers being made in the form of inserts hinged to the supports.

In the bar winding shown in FIG. 7, the spacers in the form of inserts 47 are pivotally connected to the supports 48, 49 on the lateral surfaces of the cups 50, 51 with the provision of gaps 52, 53. The value of the gaps 52, 53 is selected to be large enough for covering the possible deviations in the mutual position of the heads 6, 7 and the cups 50, 51. After assembly, the pivot joints are fixed by filling the gaps 52, 53 with an insulating compound whose solidification provides for a rigid interconnection of all heads 6, 7.

This construction, like that shown in FIGS. 4 and 5, forms a rigid ring of mutually coupled heads, which ring is closed around the machine axis, and may also be recommended for electric machines operating under heavy conditions. The proposed construction of the stator bar winding can also be used in the case where a single cup is put on the head at the end face of the machine, which cup is a combination of the two shown in FIGS. 2 to 7.

We claim:

1. A stator bar winding for an electric machine comprising in combination: end connections including heads, spaced cups insulating said heads of said end connections, spaces being provided between said heads and said cups, an insulating compound filling said spaces, spacers mounted between the adjacent cups, and supports on at least one of the lateral surfaces of said cups for fixing said spacers.

2. A stator bar winding as claimed in claim 1, in which said spacers are wedges, said supports fixing said wedges in position.

3. A stator bar winding as claimed in claim 1, in which said spacers are inserts, said supports fixing said inserts in position.

4. A stator bar winding as claimed in claim 3, in which said spacers are thread-interconnected inserts, said supports fixing said inserts in position.

5. A stator bar winding as claimed in claim 3, in which the inserts are interconnected and are provided with intercommunicating chambers, comprising a self-solidifying insulating compound in said chambers.

6. A stator bar winding as claimed in claim 5, in which the spaces between the heads and cups and the insert chambers intercommunicate and are filled with said self-solidifying insulating compound.

7. A stator bar winding as claimed in claim 4, in which the inserts include terminal spherical surfaces and engage in corresponding spherical surfaces provided in the supports.

8. A stator bar winding as claimed in claim 3, comprising and in which the connection of the inserts to the supports is made by pivot joints provided with gaps filled with a self-solidifying compound for fixing said pivot joints.

* * * * *